(12) United States Patent
Ito

(10) Patent No.: US 6,660,404 B2
(45) Date of Patent: Dec. 9, 2003

(54) MAGNETOOPTICAL RECORDING MEDIUM INCLUDING A CONNECTION LAYER THAT IS NON-MAGNETIC BY ITSELF AT ROOM TEMPERATURE BUT CAN BE INDUCED TO EXHIBIT MAGNETISM WHEN IN CONTACT WITH A MAGNETIC LAYER

(75) Inventor: Shoyu Ito, Akashi (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 09/844,403

(22) Filed: Apr. 27, 2001

(65) Prior Publication Data

US 2002/0068194 A1 Jun. 6, 2002

(30) Foreign Application Priority Data

Dec. 1, 2000 (JP) ........................................ 2000-367456

(51) Int. Cl.⁷ .............................................. G11B 11/105
(52) U.S. Cl. ...................... 428/611; 428/637; 428/668; 428/213; 428/336; 428/409; 428/694 RE; 428/694 MM; 428/694 EC; 428/694 GR; 369/13.42; 369/13.44; 369/13.45; 369/13.46; 369/13.53
(58) Field of Search ................................ 428/611, 637, 428/668, 213, 336, 409, 694 RE, 694 MM, 694 EC, 694 IC, 694 GR; 369/13.42, 13.44, 13.45, 13.46, 13.53

(56) References Cited

U.S. PATENT DOCUMENTS

| 5,683,803 A | * | 11/1997 | Nakayama et al. ......... 428/332 |
| 6,042,954 A | * | 3/2000 | Hirokane et al. ..... 428/694 ML |
| 6,096,444 A | * | 8/2000 | Tamanoi et al. ..... 428/694 ML |
| 6,141,297 A | * | 10/2000 | Kim ........................ 369/13.42 |
| 6,436,524 B1 | * | 8/2002 | Ishida et al. ................ 428/332 |
| 6,534,162 B1 | * | 3/2003 | Hirokane et al. ........... 428/212 |

FOREIGN PATENT DOCUMENTS

| JP | 5-081717 | 4/1993 |
| JP | 9-147436 | 6/1997 |
| JP | 9-320134 | 12/1997 |
| JP | 2000-173125 | 6/2000 |

\* cited by examiner

*Primary Examiner*—Paul Thibodeau
*Assistant Examiner*—Kevin M. Bernatz
(74) *Attorney, Agent, or Firm*—Greer, Burns & Crain, Ltd.

(57) ABSTRACT

A magnetooptical recording medium comprising at least a reproduction layer, an intermediate layer, a connection layer and a recording layer, wherein the reproduction layer and intermediate layer have a slant magnetic direction in a non-magnetic field, and the connection layer is composed of a layer non-magnetic at room temperature by itself which is induced to exhibit magnetism by contact with a magnetic layer.

14 Claims, 16 Drawing Sheets

Type I

Type II

Type III

Type IV

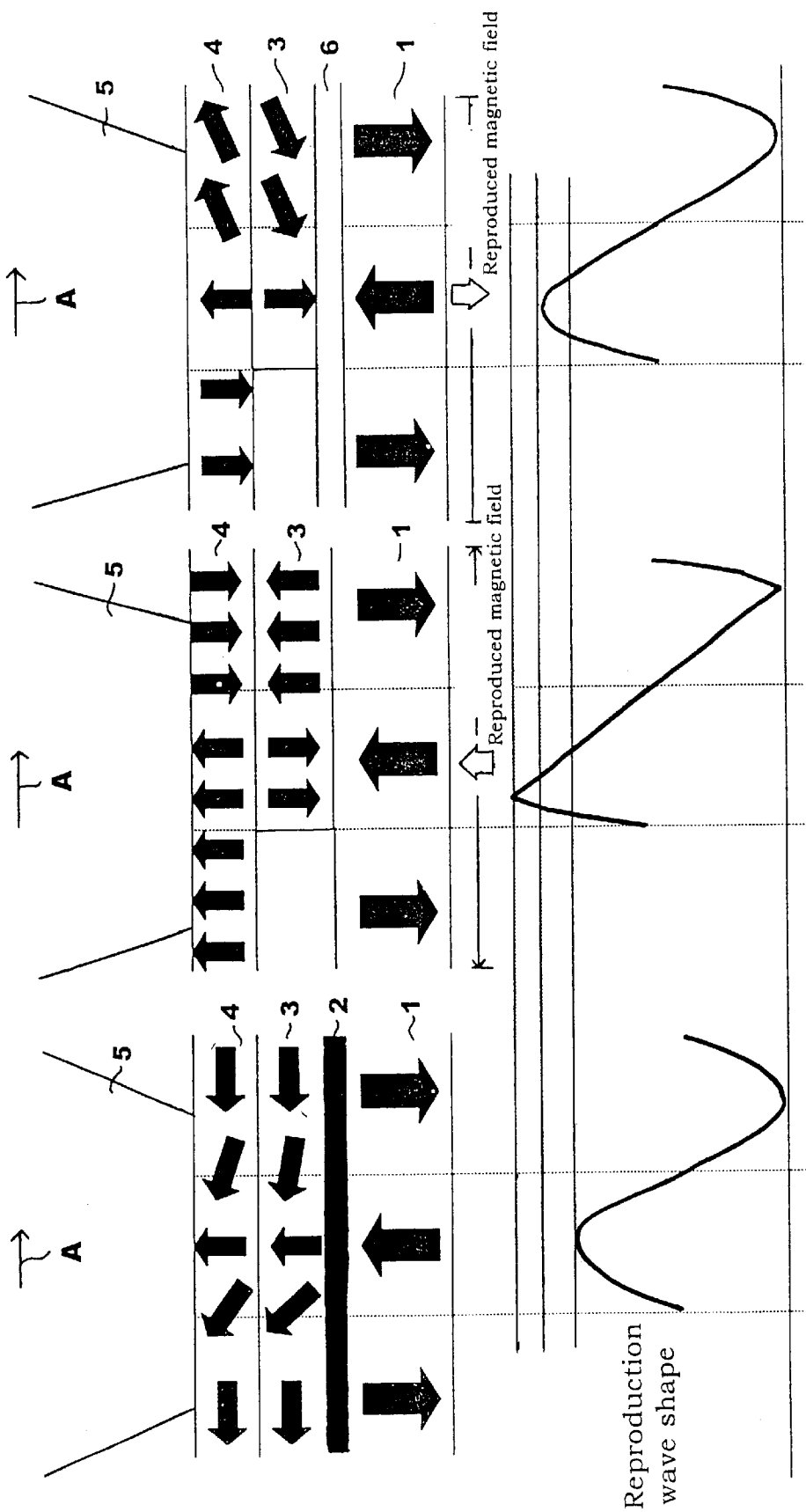

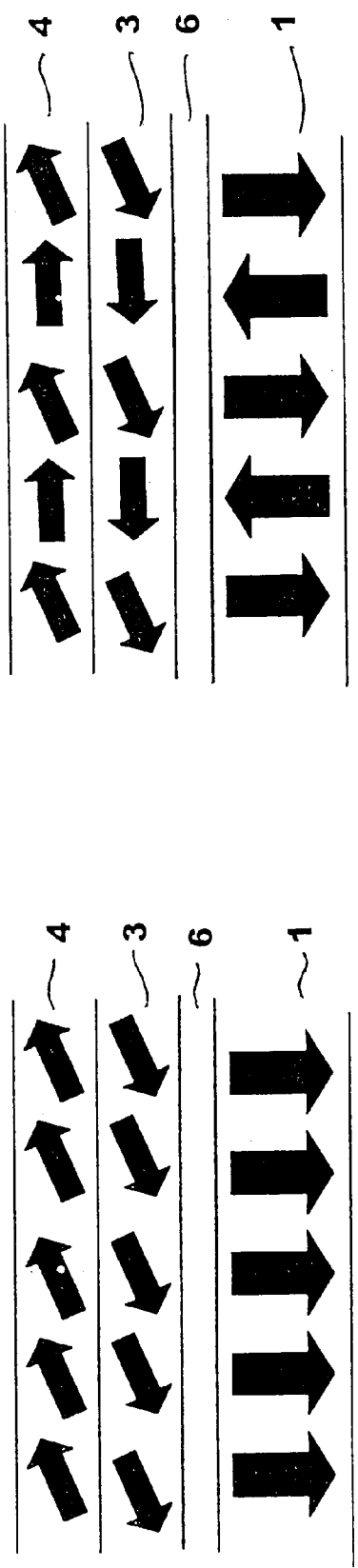
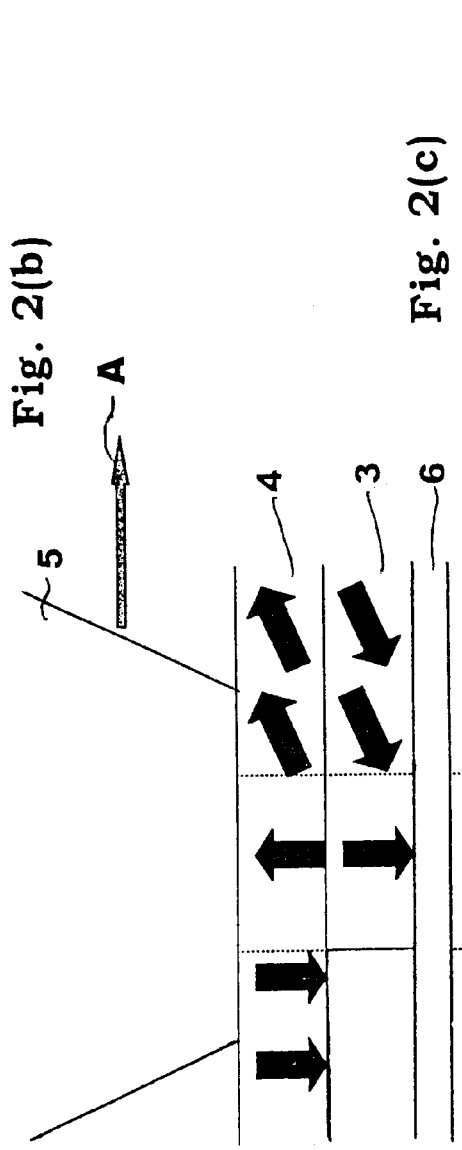
Fig. 2(a)
Fig. 2(b)
Fig. 2(c)
Reproduced magnetic field

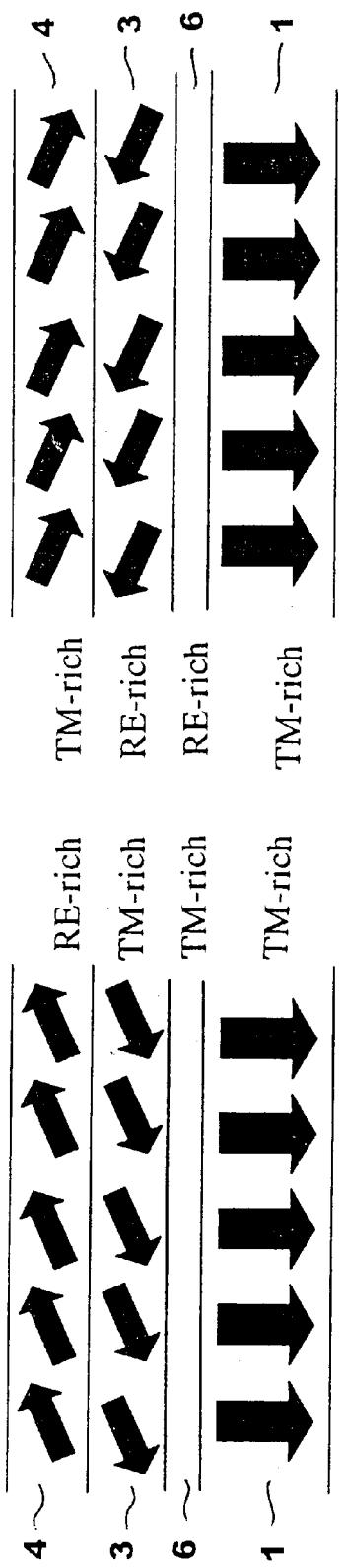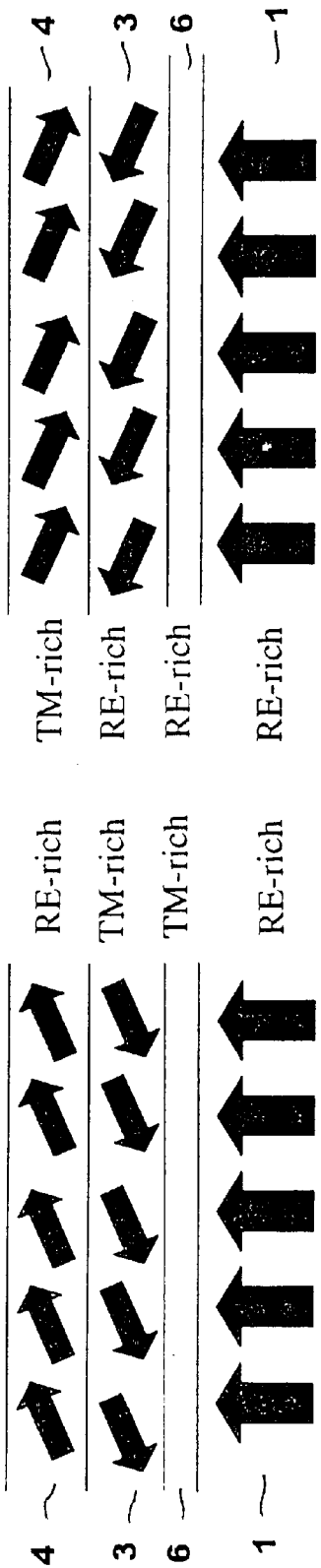
Fig. 3

MAGNETOOPTICAL RECORDING MEDIUM INCLUDING A CONNECTION LAYER THAT IS NON-MAGNETIC BY ITSELF AT ROOM TEMPERATURE BUT CAN BE INDUCED TO EXHIBIT MAGNETISM WHEN IN CONTACT WITH A MAGNETIC LAYER

CROSS-REFERENCE TO RELATED APPLICATION

This application is related to Japanese application No. 2000-367456 filed on Dec. 1, 2000, whose priority is claimed under 35 USC §119, the disclosure of which is incorporated by reference in its entirety.

BACKGROUND OF THE INVENTION

1. Field of the Invention

The present invention relates to a magnetooptical recording medium (hereinafter referred to as "medium") and a reproduction method thereof. The magnetooptical recording medium of the present invention can be suitably applicable to Partial Response Maximum Likelihood (PRML) technology.

2. Description of Related Art

The magnetooptical recording medium is known as "a high density recording medium", but further densification has been requested together with an increase of information output. A method of shortening the mark length is shown for carrying out the further densification, and therefore a magnetic super-resolution technology has been adopted. Various proposals are made as said magnetic super-resolution technology, but of them the center aperture-type magnetic super-resolution (CAD) medium (e.g. Refer to Japanese Unexamined Patent Publication No. 9 (1997)-320134) and Double Mask-Rear Aperture-type magnetic super-resolution (D-RAD) medium (e.g. Japanese Unexamined Patent Publication No. 9 (1997)-147436) have been noted. Hereinafter both media and a reproduction method of it will be explained in reference to FIGS. 1(a) and (b). Further, the medium construction is shown at the upper part of FIGS. 1(a) to (c), and the regenerated wave shape is shown at the lower part.

As shown at first by FIG. 1(a), in the former CAD method is normally used the magnetooptical recording medium composed of the recording layer 1, non-magnetic layer 2, intermediate layer 3 and reproduction layer 4, in which the reproduction layer 4 and intermediate layer 3 show an in-plane direction as magnetizing direction, and the recording layer 1 has a perpendicular magnetizing direction. When light is irradiated for reproducing the information recorded in this medium, the magnetizing direction of the recording layer is transferred to the reproduction layer in the center of the light spot 5 (high-temperature part). Around the surroundings within the light spot (low-temperature part), the magnetizing direction of the reproduction layer turns to a slant direction depending upon the influence of magnetization of the recording layer to produce a magnetic mask. The reproduction signal in reproducing the magnetic super-resolution takes almost a sine wave. Further, the arrow mark A in the figure means a moving direction of the light spot.

As shown in FIG. 1(b), in the latter D-RAD method is normally used the magnetooptical recording medium composed of the recording layer 1, intermediate layer 3 and reproduction layer 4, but the magnetizing direction of each layer is perpendicular. In irradiating light for reproducing the information recorded on this medium, the magnetizing direction of the recording layer is transferred to the reproduction layer in the center of the light spot 5 (medium-temperature part). Around the surrounding within the light spot 5, the magnetic mask is formed in the high-temperature side of the left-hand on the figure and in the low-temperature side of the fight-hand on the figure to regenerate the magnetic super-resolution, depending upon the influence of the reproducing magnetic field. Further, the blank part of the intermediate layer 3 is heated at temperature more than the Curie temperature, while showing the state of non-magnetization. This method has no part in which the magnetizing direction faces a slant direction in the reproduction layer as in CAD method. The reproduction signal during the reproduction takes so steep a change on the wave shape in comparison with that of CAD method as to produce a distorted wave shape far from the sine wave. This signal changes so steep, because the magnetizing direction to be a mask in the low-temperature side turns downward and the magnetizing direction in the part to be transferred turns upward.

As shown from the figures, D-RAD method takes a bigger amplitude than that of CAD method. In other words, this means a high resolution capacity. Therefore, D-RAD method has a better C/N than that of CAD method.

However, CAD method may improve C/N by about 2 dB by using a signal treating process customarily called PRML technology. This technology is based on the fact that the reproduction wave shape has a sine wave, but it is difficult to apply PRML technology in the case of D-RAD method.

SUMMARY OF THE INVENTION

As the result of keen investigations, the inventor has found that, in view of the advantages and problems of said D-RAD method and CAD method, the reproduction wave shape in the medium used in D-RAD method is almost close to the sine wave, thereby the medium is able to apply PRML technology.

Accordingly, the present invention is to provide a magnetooptical recording medium comprising at least a reproduction layer, an intermediate layer, a connection layer and a recording layer, wherein the reproduction layer and intermediate layer have a slant magnetic direction in a non-magnetic field, and the connection layer is composed of a layer non-magnetic at room temperature by itself which is induced to exhibit magnetism by contact with a magnetic layer.

Further, the present invention is to provide a magnetooptical recording medium comprising at least a reproduction layer, an intermediate layer, a connection layer and a recording layer, wherein the reproduction layer and intermediate layer have a shift amount of 200~50 Oe in absolute value and the connection layer is composed of a layer non-magnetic at room temperature by itself which is induced to exhibit magnetism by contact with a magnetic layer.

Further, since the regenerated wave shape is near a sine wave, PRML technology may be applied so that there can be realized C/N bigger than that of the medium to be used in D-RAD method.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1(a) to (c) show an outline explanation on the reproduction state of the magnetooptical recording medium in the present invention and that of conventional technology.

FIGS. 2(a) to (c) show an outline explanation of the erasing, recording and reproduction state of the magnetooptical recording medium in the present invention.

FIG. 3 shows an outline constitution of the magnetooptical recording medium in the present invention.

DESCRIPTION OF THE PREFERRED EMBODIMENTS

Figure 4:
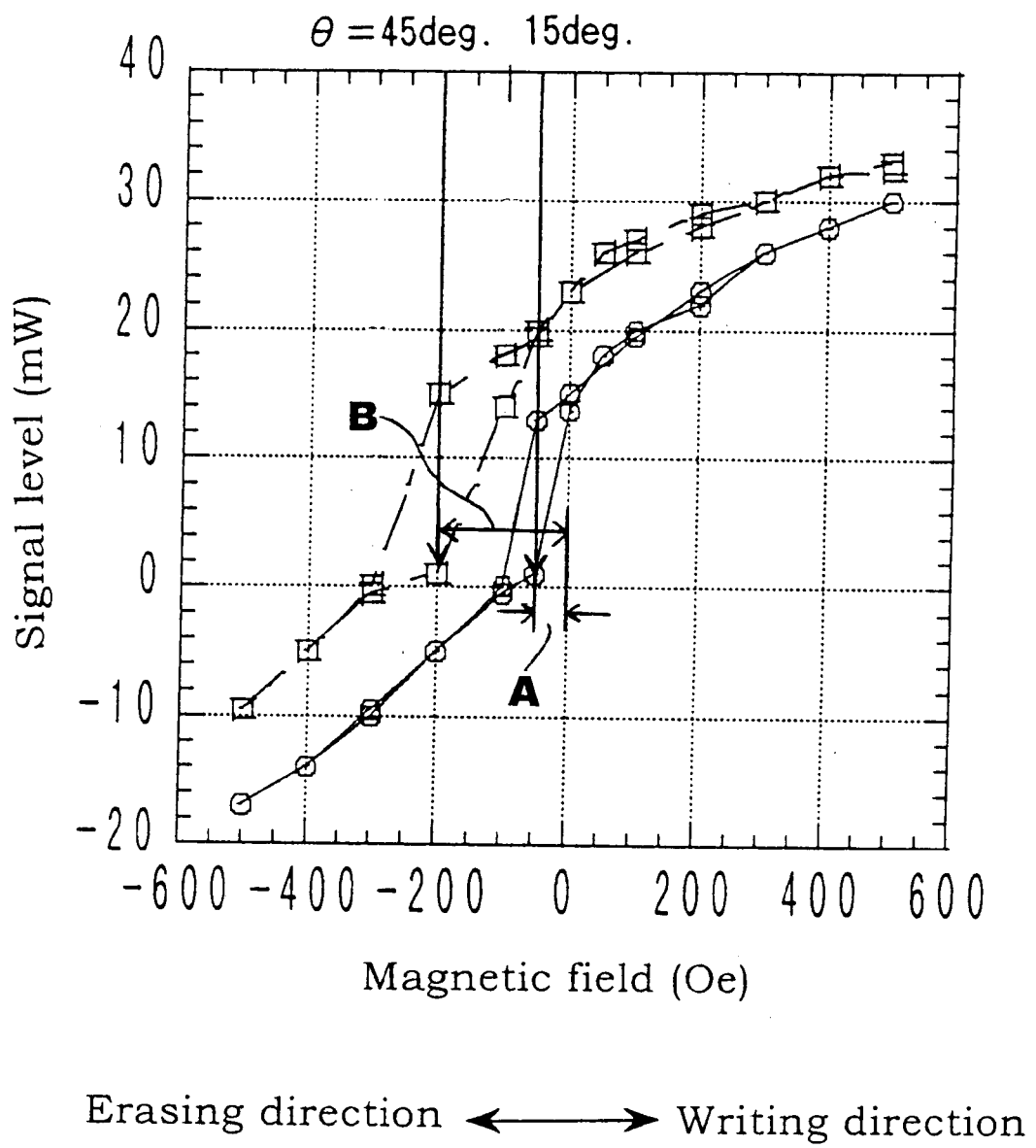
FIG. 4 shows the relation of the signal level and the magnetic field of the magnetooptical recording medium in the present invention.

As one of the features, in case of non-magnetic field (in the absence of the external magnetic field), the magnetooptical recording medium of the present invention turns the magnetizing direction of the reproducing layer and intermediate layer to a slant direction, neither to the inplane direction as in the reproduction layer and intermediate layer of the medium to be used in CAD method, nor to the perpendicular direction as in the reproduction layer and intermediate layer of the medium to be used in D-RAD method. In order to realize this magnetizing direction, the medium of the present invention includes the constitution to be used in D-RAD method as a basis and involves the connection layer between the reproduction layer—intermediate layer and the recording layer for weakening the exchange coupling force.

As shown in FIG. 1(c), concretely in the rear part of a light spot, the magnetizing direction of the reproduction layer can improve C/N better than in CAD method because of being in exact direction to the central part of the light spot (transfer part) under the influence of the reproduction magnetic field. Further, in the front part of the light spot the magnetizing direction of the reproduction layer may allow the reproduction wave shape to make close to a sine wave because of taking a slant direction. In this figure, 6 mean the connection layer.

The medium of the present invention turns the magnetization in the reproduction layer and intermediate layer to a slant direction under the state of erasing (See FIG. 2(a)). In the state of recording, magnetization in the reproduction layer and intermediate layer corresponding to the recorded part turns to the inplane direction under the influence of the magnetization of the recording layer (See FIG. 2(b)). Further, in the state of reproduction, the magnetizing direction of the reproduction layer is in direct opposition to the central part of the light spot (transfer part, medium temperature part) in the rear part (rear part, high temperature part) of the light spot. The magnetizing direction of the reproduction layer is slant in the front part (front part, low temperature part) of the light spot, and magnetization in the recording layer is transferred to the reproduction layer in the central part of the light spot (See FIG. 2(c)).

In other words, the medium of the present invention has smaller C/N than the medium to be used in D-RAD method, but bigger C/N than the medium to be used in CAD method. Explaining FIGS. 1(a) to (c), the magnetizing direction of the reproduction layer changes from inplane to perpendicular in the medium to be used in CAD method, as shown in FIG. 1(a). On the contrary, the magnetizing direction of the reproduction layer changes 180° as it is in the perpendicular in the medium to be used in D-RAD method, as shown in FIG. 1(b). Thus, of both media, D-RAD method shows bigger variation on the magnetizing direction of the reproduction layer. The variation has a co-relation with the size of the amplitude in the regenerated wave shape, and D-RAD method may get a regenerated wave shape with higher amplitude. On the other hand, the medium of the present invention changes from slant direction to perpendicular direction because of being slant on the magnetizing direction in the reproduction layer. Thus, there exists a perpendicular component on the magnetizing direction, and therefore its amplitude becomes bigger than that of CAD method and smaller than that of D-RAD method.

Further, since the regenerated wave shape is near by sine wave, PRML technology may be applied so that there can be realized C/N bigger than that of the medium to be used in D-RAD method.

Constitution of the medium to be used in the present invention will be shown below.

At first, there is no special limitation on the connection layer, as far as it means a layer which is non-magnetic by itself at room temperature, being induced into magnetism by contact with other magnetic layer. Examples of the connection layer are a layer of alloys such as GdNd, GdPr, GdSm, NdFeBi, AlFe, and the like. Thickness and compositions of this connection layer can be regulated appropriately so as to be charged with the features above.

Those layers to be used in D-RAD method may be used as the reproduction layer, intermediate layer and recording layer without limitation. In particular, these layers may be preferably composed of rare earth-transition metal alloy layers. Examples of these layers are those composed of GdFe, TbFeCo, GdFeCo, TbDyFeCo, TbGdFeCo, DyGdFeCo, GdFeCoSi, and so on. The composition and combination are regulated so that the layers above-described may be charged with desired features. In particular, the intermediate layer and connection layer may be preferably charged with the same sense of magnetization. Here the same sense of magnetization means that both layers have a composition of transition metal-rich or that of rare earth element-rich, respectively.

Furthermore, the reproduction layer and intermediate layer take preferably a contraxy magnetizing direction to each other. If they take the same direction, the magnetization of both layers are added up to a large degree so that it may be difficult to have perpendicular magnetization at transfer temperature. In addition, it is preferable that the reproduction layer takes higher Curie temperature than that of the intermediate layer (Concretely, the reproduction layer has preferably higher Curie temperature by 60–120° C. (i.e. about 60° C. to about 120° C.) than that of the intermediate layer for facilitating to form a rear mask). Moreover, the intermediate layer has a function of regulating so as to facilitate the control of magnetizing the reproduction layer.

FIG. 3 shows an example of the constitution of the layers on the medium of the present invention. In the figure, RE-rich means a composition of rare earth-rich, and TM-rich means a composition of transition metal-rich. As shown in FIG. 3, the combination of the reproduction layer, intermediate layer, connection layer and recording layer illustratively includes a combination of RE-rich layer, TM-rich layer, TM-rich layer and TM-rich layer (Type I), a combination of TM-rich layer, RE-rich layer, RE-rich layer and TM-rich layer (Type II), a combination of RE-rich layer, TM-rich layer, TM-rich layer and RE-rich layer (Type III) and a combination of TM-rich layer, RE-rich layer, RE-rich layer and RE-rich layer (Type IV). Of them, Type I to Type III showing a comparatively strong exchange coupling force between the recording layer and connection layer is more preferable, and in particular Type I showing the stronger force is preferred. As can be seen in FIG. 3, the reproduction layer has a magnetization direction that is approximately 180° different from that of the intermediate layer.

Since it is difficult to directly measure the angle of magnetizing direction, the following calculation is adopted in the present invention. Thus, a signal level corresponding to the Kerr rotary angle obtained from the reproduction layer is measured, by applying the magnetic field (+/−) while irradiating laser light of low and constant reproducing power whereby only the reproduction layer and intermediate layer can be regenerated, namely there can bring about no transfer of magnetizing the recording layer. Shift amount in the magnetic field is calculated by confirming the point wherein the signal level of hysteresis loop obtained stands up vigorously from 0 mV (part wherein the magnetizing direction changes into the inplane direction). This shift amount has a proportional relation with the magnetizing direction of the reproduction layer, and the angle of the magnetizing direction in the reproduction layer and intermediate layer can be calculated from this amount. Practical example will be explained on FIG. 4.

EXAMPLE

Example 1

At first this test was carried out on Type I.

As media were used Medium 1 corresponding to Type I as shown in FIG. 3, composed of the reproduction layer of Gd27Fe58Co15 (40 nm thickness; the number after chemical element means atom %), the intermediate layer of Gd15Fe85 (20 nm thickness), the connection layer of Gd10Nd90 (7 nm thickness) and the recording layer of Tb21Fe59Co20 (50 nm thickness) and Medium 2 having the same composition as in Medium 1 (except that the connection layer of Gd15Nd85 (7 nm thickness) was used). The same composition of Medium 1 was used in other three layers.

Each layer was prepared by DC sputtering system, whereby the recording layer was formed under the conditions of 1 Pa of gas pressure and 0.5 kW of applied power, the intermediate layer was formed under the conditions of 0.5 Pa of gas pressure and 0.8 kW of applied power, the connection layer was formed under the conditions of 0.5 Pa of gas pressure and 0.5 kW of applied power, and the reproduction layer was formed under the conditions of 0.8 Pa of gas pressure and 0.8 kW of closing electric power. Curie temperature of each layer was as follows: the reproduction layer, 250° C.; the intermediate layer, 185° C.; the recording layer, 280° C.

The reproduction power (Pr) was applied by 1.5 mW from the reproduction layer to the recording layer, and the rotary rate of the medium (v) was adjusted to 7.5 m/s. FIG. 4 shows the hysteresis loop of the reproduction layer on Medium 1 and Medium 2. In FIG. 4, ○ corresponds to Medium 1 and □ corresponds to Medium 2. As shown from this figure, shift amount of Medium 1 is about −50 Oe (A in the figure) and shift amount of Medium 2 is about −200 Oe (B in the figure). It is presumed that the shift amount increases, as the magnetizing direction of the reproduction layer turns from inplane to perpendicular, and it corresponds to 15° in case of Medium 1 and 45° in case of Medium 2.

Figure 5:
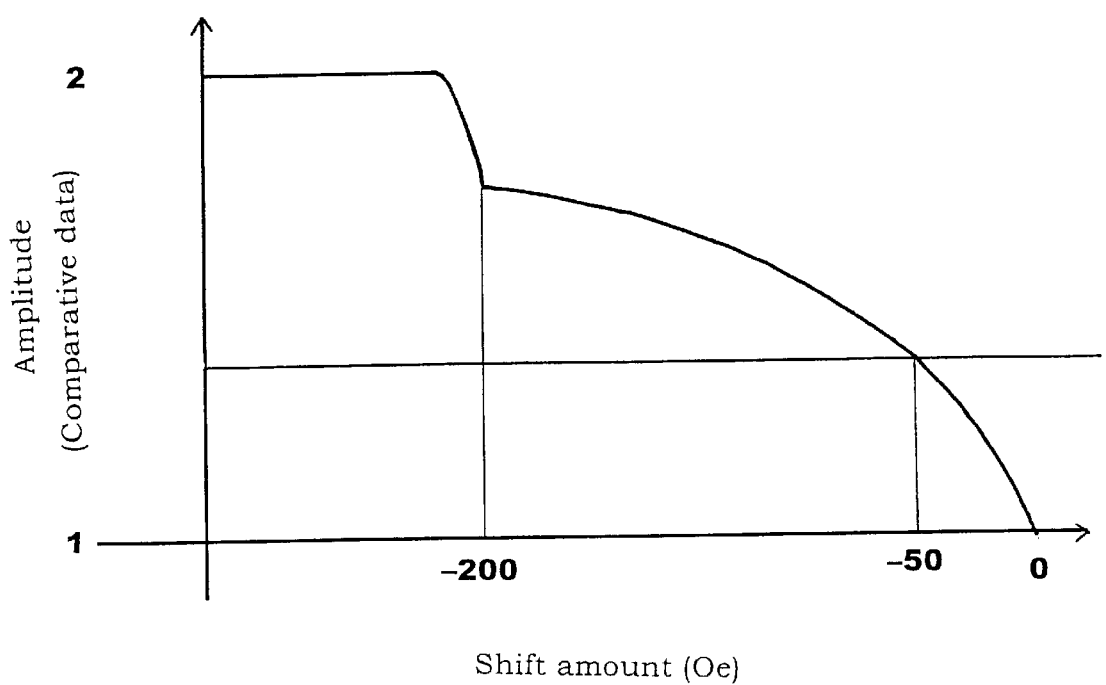
FIG. 5 shows the relation of the shift amount and amplitude of the magnetooptical recording medium in the present invention.

FIG. 5 shows typically the relation of shift amount and amplitude of the regenerated signal. The horizontal axis means a shift amount (Oe), and the vertical axis shows a comparative value wherein the amplitude is 1 when the shift amount is 0 Oe. Further, in FIG. 5 it corresponds to the medium in CAD method when the amplitude is 1 and it corresponds to the medium in D-RAD method when the amplitude is 2. It is evident from FIG. 5 that it takes the amplitude larger than the medium in CAD method when the shift amount is less than −50 Oe. In addition, the amplitude becomes rapidly big when it exceeds −200 Oe, and so the regenerated wave shape approaches to that of D-RAD method into distortion. Thus, preferable shift amount of the medium in the present invention is −200 to −50 Oe.

Further, the symbol of the shift amount depends upon the imprinting direction of the magnetic field but differs depending upon either the writing direction or erasing direction. The relation of the absolute value of the shift amount and the amplitude and reproduction wave shape remains constant, being indifferent to positive and negative of the symbol.

Example 2

Figure 6:
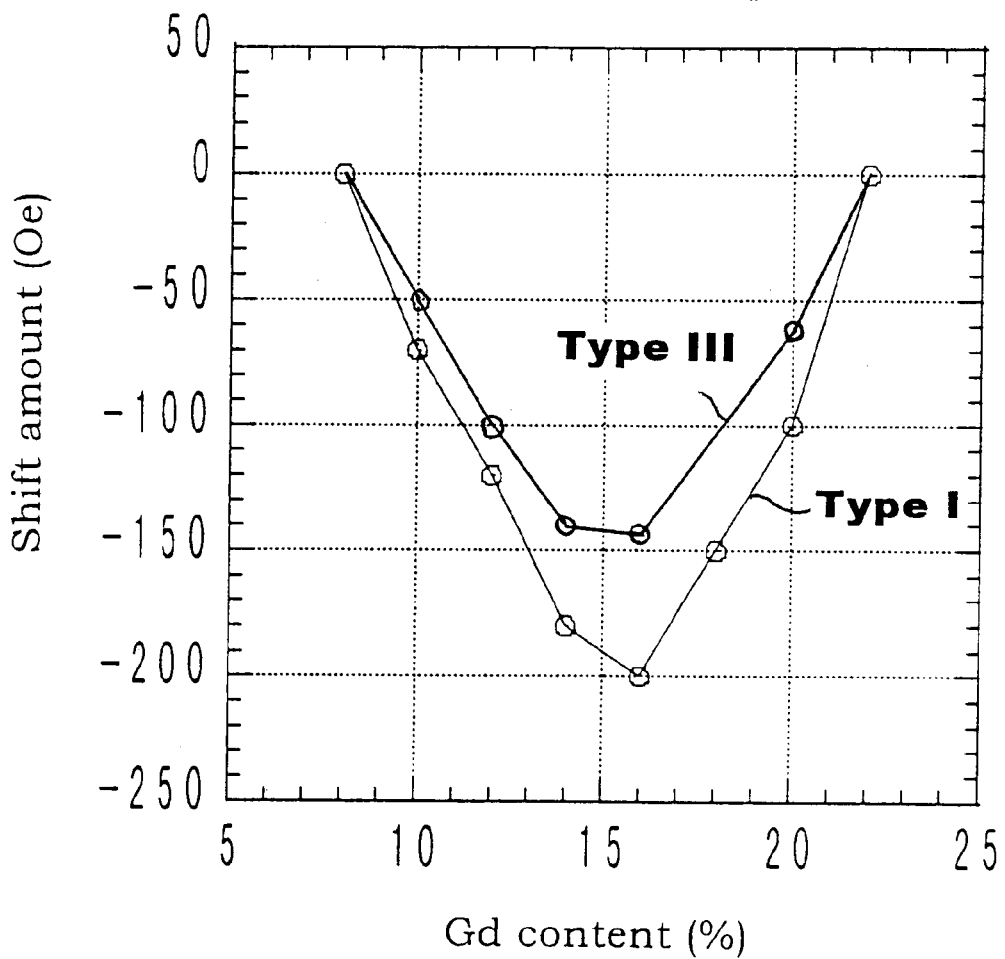
FIG. 6 shows the relation of the shift amount of the connection layer and the content of Gd in the magnetooptical recording medium of the present invention.

The composition of GdNd layer was examined, on the connection layer of GdNd layer in Type I and Type III of FIG. 3. The medium was prepared and its shift amount was measured under the same conditions except that the content of Gd was varied. In this case, the recording layer in Type I was Tb21Fe59Co20 layer (50 nm thickness) and Type III was Tb25Fe55Co20 layer (50 nm thickness). FIG. 6 shows the result. It is evident from FIG. 6 that a TM-rich composition of Gd9~21Nd91~79 is preferred for turning not less than 15° on the magnetizing direction (shift amount, not more than −50 Oe) in Type I. Further, in Type III, a TM-rich composition of Gd10~20.5Nd90~79.5 is preferred therefore.

Example 3

Figure 7:
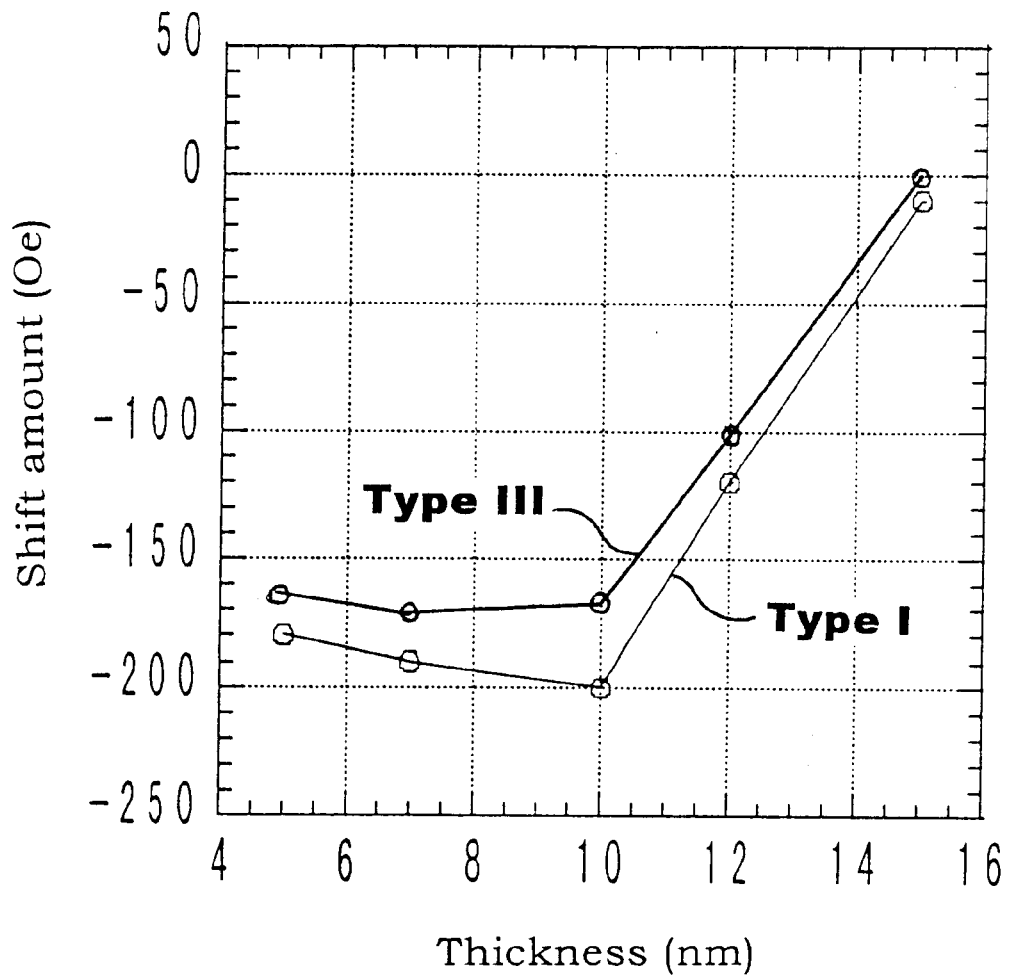
FIG. 7 shows the relation of the shift amount of the connection layer and the thickness in the magnetooptical recording medium of the present invention.

Further, thickness of the connection layer was examined in Type I and Type III of FIG. 3 above-described. The medium was prepared and the shift amount of the medium was measured under the same conditions of Example 2 except that the composition of the connection layer was fixed to Gd15Nd85 and thickness of the connection layer was varied. FIG. 7 shows the result. It is evident therefrom that, for turning not less than 15° of the magnetizing direction, it is preferable to have not more than 14 nm of thickness of the connection layer. Appropriate lower limit on thickness of the connection layer is preferably not less than 5 nm, since if said layer is too thin, the magnetizing direction becomes easily perpendicular and the reproduction wave shape is far from sine wave.

Figure 8:
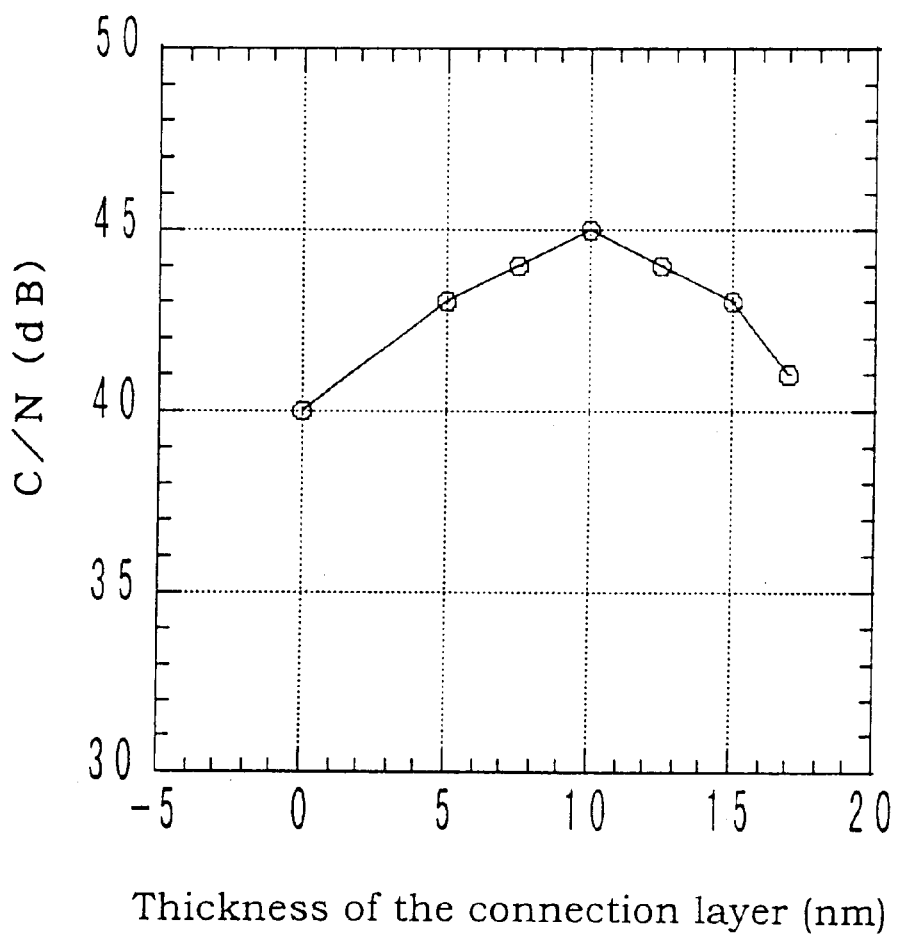
FIG. 8 shows the relation of C/N and the thickness of the magnetooptical recording medium in the present invention.

In the medium of Type I wherein the composition of the connection layer was fixed to Gd15Nd85, FIG. 8 shows the relation of thickness of the connection layer and C/N. It is evident from FIG. 8 that preferable thickness of the connection layer is 5 to 14 nm, and about 10 nm is more preferable.

Measuring conditions of said C/N are as follows. Laser light with 660 nm wave length was irradiated over the medium of 3 mW of reproduction power and 7.5 m/sec of linear velocity, and 0.4 μm of recording mark was regenerated by applying 100 Oe of the reproduction magnetic field.

Example 4

Next, the composition of GdNd layer was examined in case of the connection layer of GdNd layer in Type II and Type IV of FIG. 3. In this case, the connection layer was commonly fixed to GdNd, and as the medium of Type II, the reproduction layer of Gd20Fe65Co15 (35 nm thickness), the intermediate layer of Gd27Fe73 (15 nm thickness) and the recording layer of Tb21Fe59Co20 (50 nm thickness) were used. As the medium of Type IV, the reproduction layer of Gd20Fe65Co15 (30 nm thickness), the intermediate layer of Gd27Fe73 (10 nm thick membrane) and the recording layer of Tb25Fe55Co20 (50 nm thick membrane) were used. The medium was prepared under the same conditions as in Example 1, while Gd content of the connection layer was varied. The shift amount of the medium was measured.

Figure 9:
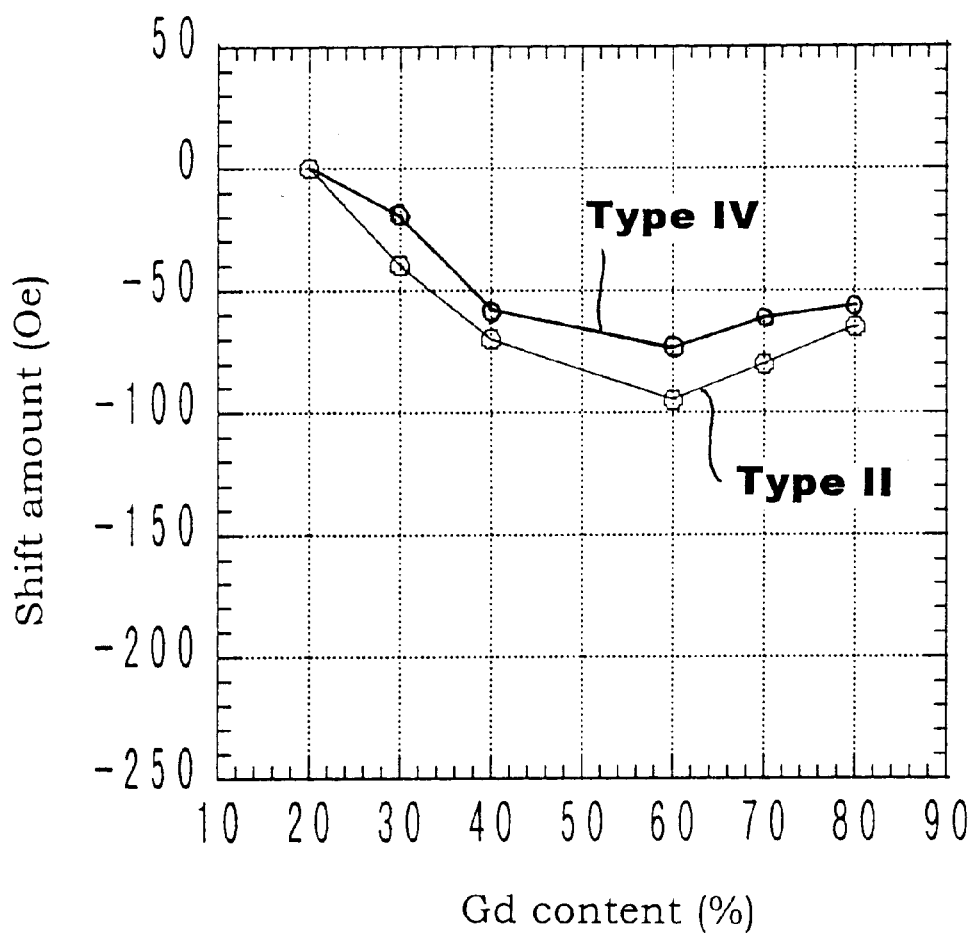
FIG. 9 shows the relation of the shift amount of the connection layer and the content of Gd in the magnetooptical recording medium of the present invention.

FIG. 9 shows the result. It is evident from FIG. 9 that a RE-rich composition of Gd34~80Nd66~20 is preferred in Type II for turning not less than 15° on the magnetizing direction (shift amount, not more than −50 Oe). Further, in Type IV, a RE-rich composition of Gd36~80Nd64~20 is preferred therefore.

Example 5

Figure 10:
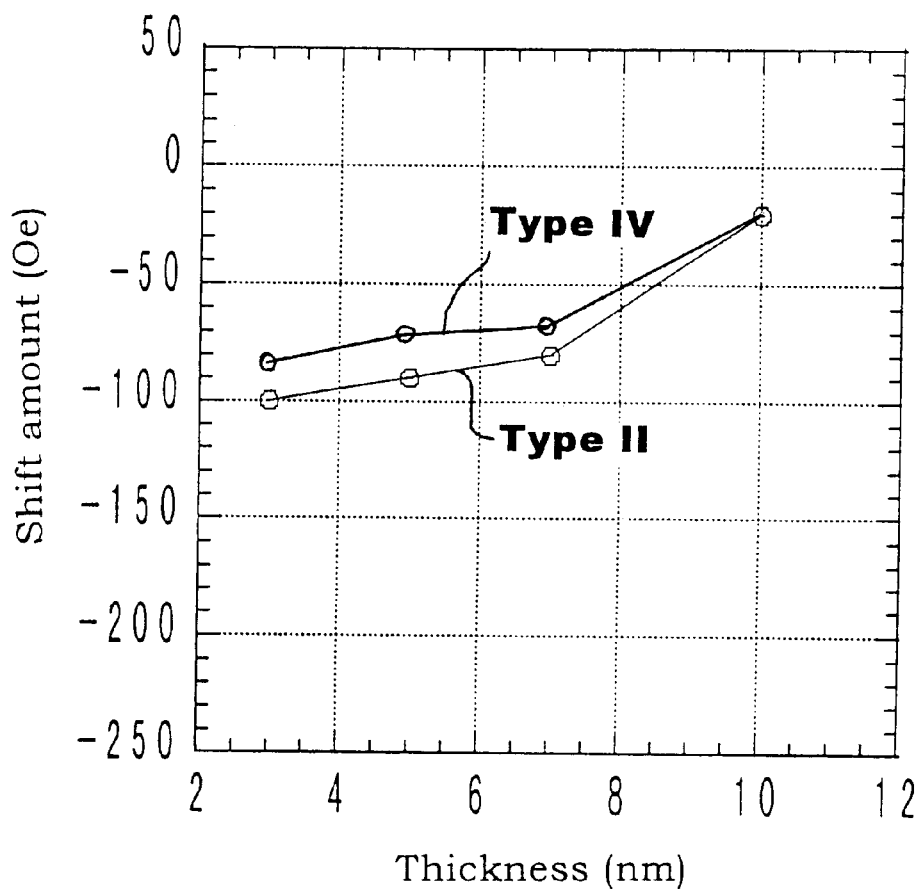
FIG. 10 shows the relation of the shift amount of the connection layer and the thickness in the magnetooptical recording medium of the present invention.

Further, thickness of the connection layer was examined in Type II and Type IV of FIG. 3 above-described. The medium was prepared and the shift amount of the medium was measured under the same conditions of Example 4 except that the composition of the connection layer was fixed to Gd40Nd60 and thickness of the connection layer was varied. FIG. 10 shows the result. It is evident therefrom that, for turning not less than 15° of the magnetizing direction, it is preferable to have not more than 8.5 nm of thickness of the connection layer. Appropriate lower limit on thickness of the connection layer is preferably not less than 3 nm, since if said layer is too thin, the magnetizing direction becomes easily perpendicular and the reproduction wave shape is far from sine wave.

Example 6

Figure 11:
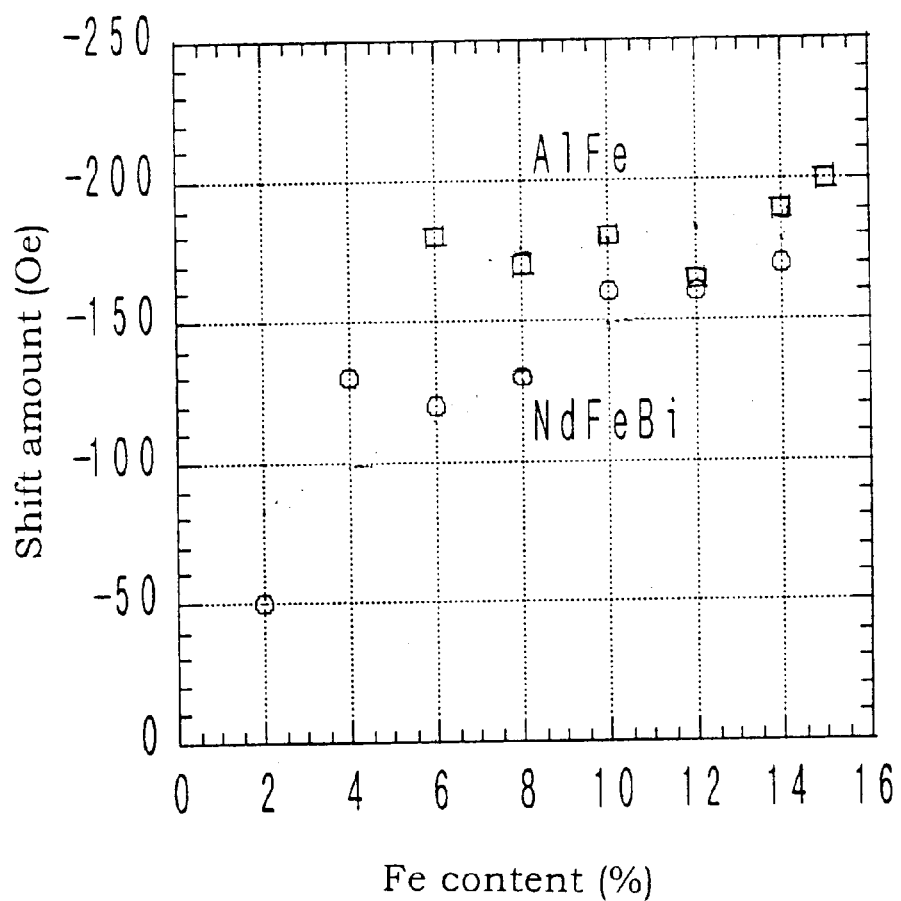
FIG. 11 shows the relation of the shift amount of the connection layer and the content of Fe in the magnetooptical recording medium of the present invention.

Then, the connection layer except for GdNd layer was examined. On the medium of Type I~III, the medium was prepared and the shift amount of the medium was measured under the same conditions as in Examples 2 and 4 except that NdFeBi layer or AlFe layer was used in place of GdNd layer under varying the amount of Fe. FIG. 11 shows the result. It is evident from FIG. 11 that, in case of NdFeBi layer, preferable Fe content is not less than 2 atom %, in particular more preferably 2~14 atom %, and in case of AlFe layer, 6~15 atom % is preferable. Further, if Fe content exceeds this limit in both layers, the magnetization will become perpendicular. If Fe content is not more than 6 atom % in case of AlFe layer, the magnetization will become inplane.

Example 7

Figure 12A:
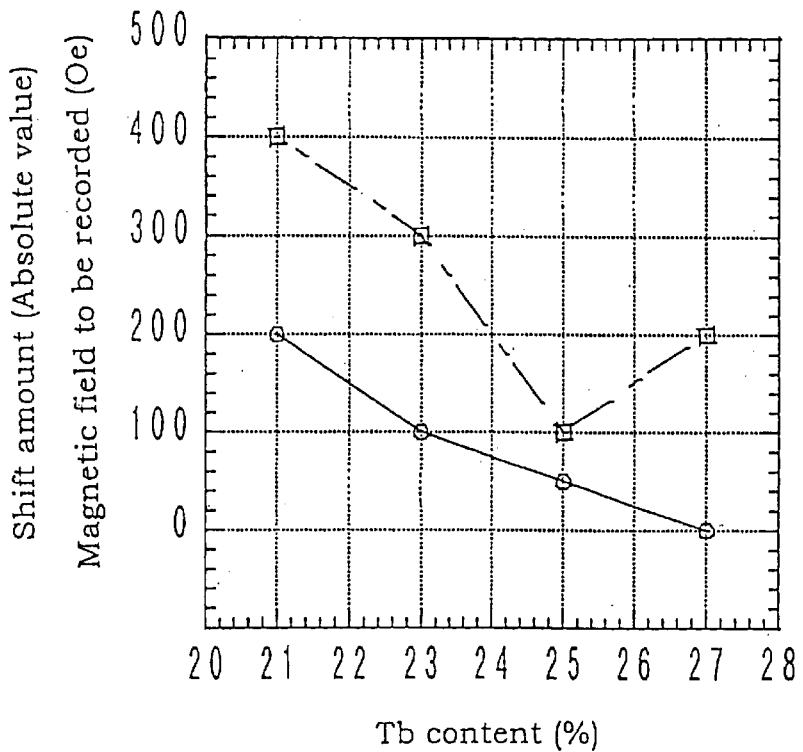
FIGS. 12(a) and (b) show the relation of the magnetic field and the content of Tb, in case where the recording layer of the magnetooptical recording medium in the present invention is composed of a single layer and a double layer.

Next, the recording layer of the medium in the present invention may have plural layers. In recording by the modulated magnetic field, it is profitable to have as small magnetic field to be recorded as possible. Therefore, the recording layer may be made into a double-layer for lowering the magnetic field to be recorded without influencing over the feature of magnetizing the reproduction layer and intermediate layer at the time of reproduction. The magnetic field to be recorded and said shift magnetization both in case of the magnetic field to be recorded being a single layer and in case of it being a double-layer were measured. Practically there was used a medium composed of the reproduction layer of Gd27Fe58Co15 (40 nm thickness), the intermediate layer of Gd15Fe85 (20 nm thickness), the connection layer of Gd15Nd85 (7 nm thickness) and the recording layer of TbxFe80-xCo20 (50 nm thickness) in case of the recording layer being a single layer, while varying the content of Tb. In case of the recording layer being a double-layer, there was used a medium composed of the recording layer (first recording layer) of Tb21Fe59Co20 in the side of the connection layer and the second recording layer of TbxFe82-xCo18 on the first recording layer while varying the content of Tb in the second recording layer, varying the thickness of the second recording layer as 5, 7.5 and 10 nm and varying the thickness of the first recording layer as 45, 42.5 and 40 nm. FIGS. 12(a) and (b) show the result of measurement in both cases of the recording layer being a single layer and a double layer. In the figures, ○ is the shift amount and □ is the magnetic field to be recorded.

Figure 12B:
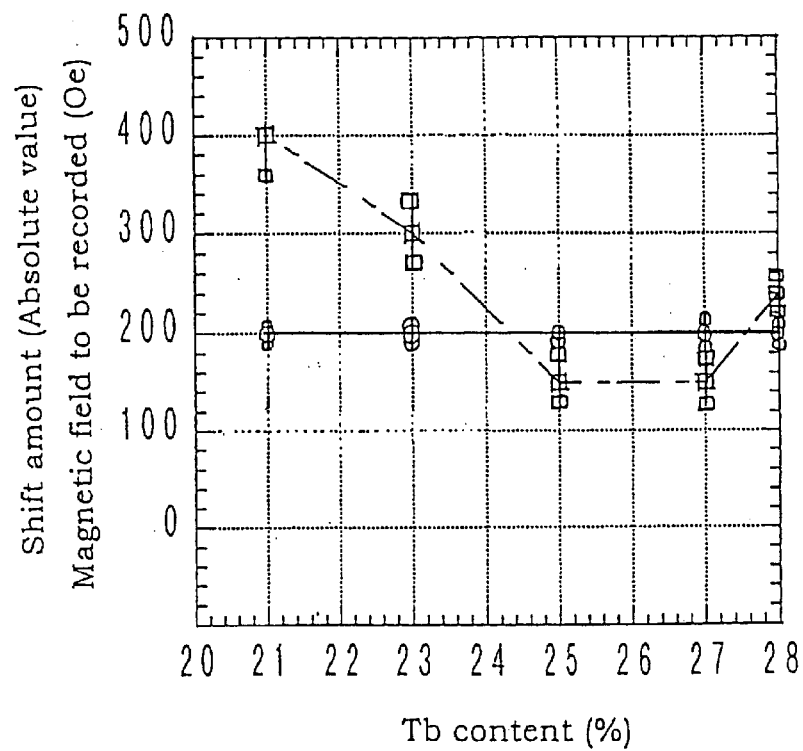

As shown in FIG. 12(b), the shift amount is realized by the first recording layer, and the magnetic field to be recorded can be lowered in a broad scope of Tb content by the second recording layer. On the contrary, the magnetic field to be recorded can be lowered by increasing the Tb content even in case of the recording layer being a single layer, as shown from FIG. 12(a), but if it exceeds a prescribed amount, the initial object cannot be attained because the shift magnetization also becomes too small. It is evident that, in case of the recording layer being a single layer, the scope of Tb content being capable of attaining a prescribed shift amount and the reduction of magnetic field to be recorded is narrow.

Example 8

Figure 13:
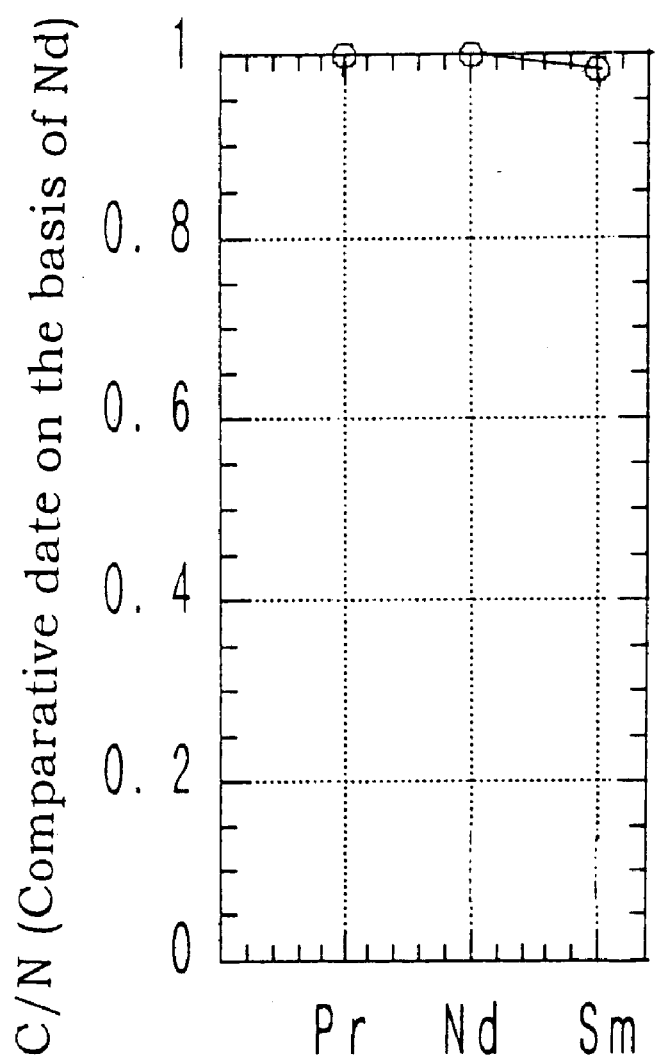
FIG. 13 shows the relation of the constituting elements in the connection layer and C/N in the magnetooptical recording medium of the present invention.

Further, C/N was measured when the connection layer composed of GdNd was replaced by that of GdPr or GdSm. The connection layer had a composition of Gd15Pr85 (15 nm thickness) or Gd15Sm85 (10 nm thickness), and the constitution of the other media was the same as in those of Example 1. Measuring conditions were as follows: reproduction power (Pr), 3.0~3.5 mW; peripheral speed (v) of the medium, 7.5 m/s; and mark length, 0.4 μm. FIG. 13 shows the result. Vertical axis shows the comparative data in case where C/N measured in Example 1 was defined as 1. It is evident from the figure that C/N being no way inferior to GdNd was attained both in GdPr and GdSm.

Example 9

Figure 14:
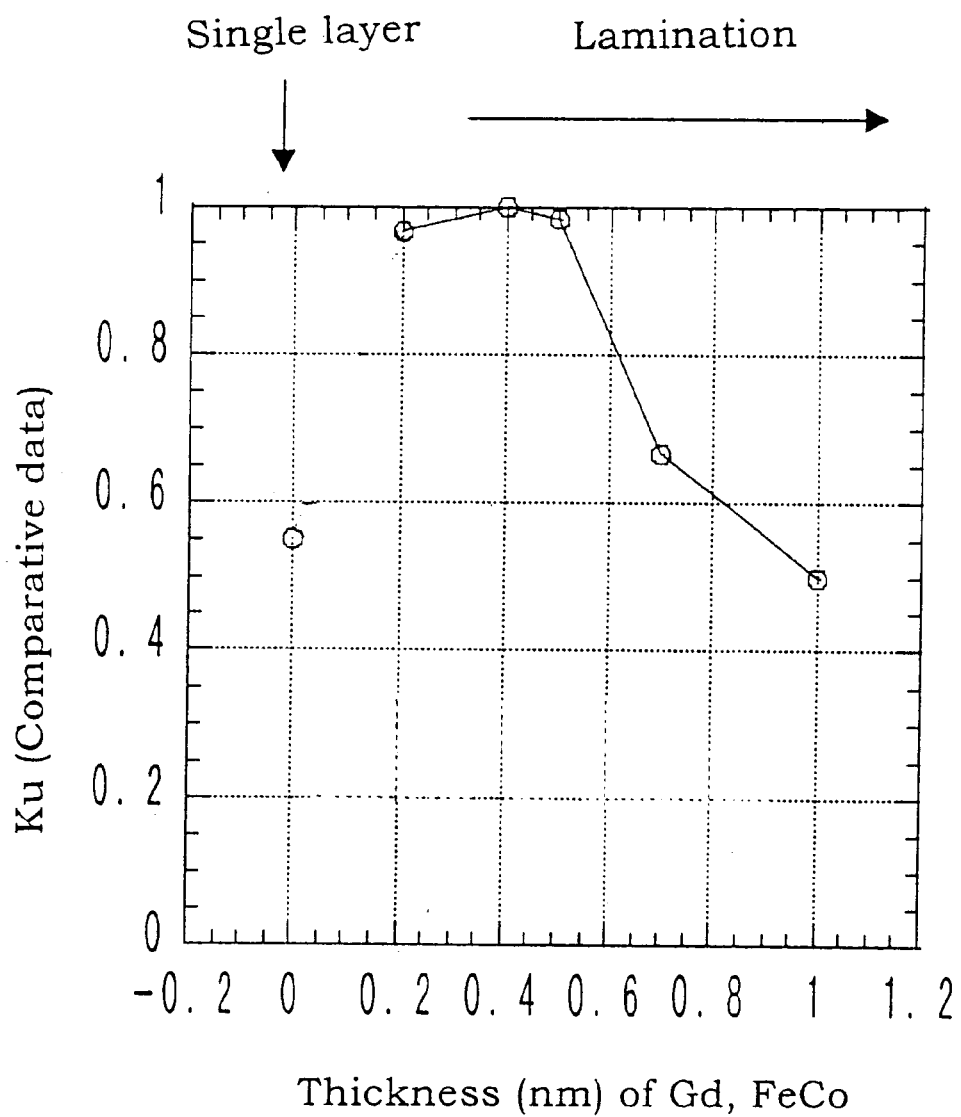
FIG. 14 is to evaluate the thermostability in case where the reproduction layer of the magnetooptical recording medium in the present invention is composed of a single layer and a laminate.

Next, a single layer of the reproduction layer is good, but it may be effective in case of being multi-layered. Thermostability of the reproduction layer on the medium of the present invention was examined. For example, the reproduction layer of the medium used in Example 1 was replaced by a laminate of Gd and FeCo, wherein the ratio of thickness on Gd and FeCo was fixed to 1:1 to prepare a film of total thickness 30 nm on the substrate. This medium was annealed at 200° C. for 1 hour corresponding to aging with the lapse of time for 5~10 years, whereby the anisotropic constant Ku was measured. FIG. 14 shows the result. In FIG. 14, the horizontal axis shows thickness of Gd and FeCo, respectively, and 0 shows the case of a single layer. Thickness of the reproduction layer was 40 nm in Example 1, but herein it was 30 nm. The vertical axis is a value obtained by dividing the original Ku with Ku after annealing. It is evident from the figure that the scope of thickness of Gd and FeCo each from 0.2~0.5 nm is particularly favorable (For example, 30 layers are laminated in case of Gd 0.5 nm, FeCo 0.5 nm). Therefore, it is clear that there is found nearly no aging with the lapse of time if the reproduction layer having a laminate structure of 0.2~0.5 nm.

Example 10

Figure 15:
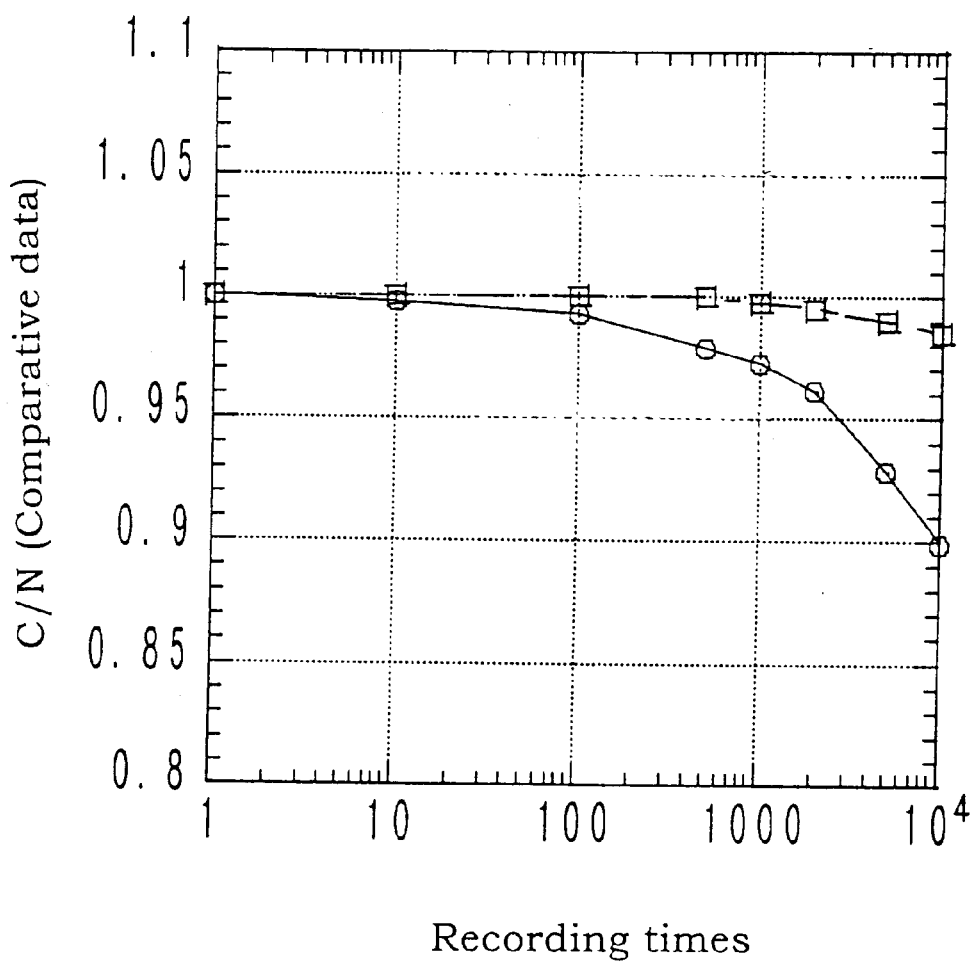
FIG. 15 is to evaluate the repeating times of recording in case where the reproduction layer of the magnetooptical recording medium in the present invention is composed of a single layer and a laminate.

The medium of Example 1 on the reproduction layer only was prepared in the same manner as in Example 9. FIG. 15 shows C/N with the lapse of time when recording was repeated on media having the multi-layered reproduction layer and single-layered reproduction layer. The conditions for reproduction were same as in Example 3. On the multi-layered reproduction layer, Gd and FeCo showed each 0.4 nm thickness and 30 nm of total thickness. In the figure, □ means the medium of the multi-layered reproduction layer, and ○ means the medium of the single layer. As shown from the figure, the number of repeating times can be extended in case of the medium of the multi-layered reproduction layer in comparison with in case of the single-layered medium.

Furthermore, the scope of the present invention is not limited to those examples above-described and can be extended to any variation unless they disturb the effect of the present invention.

Figure 16B:
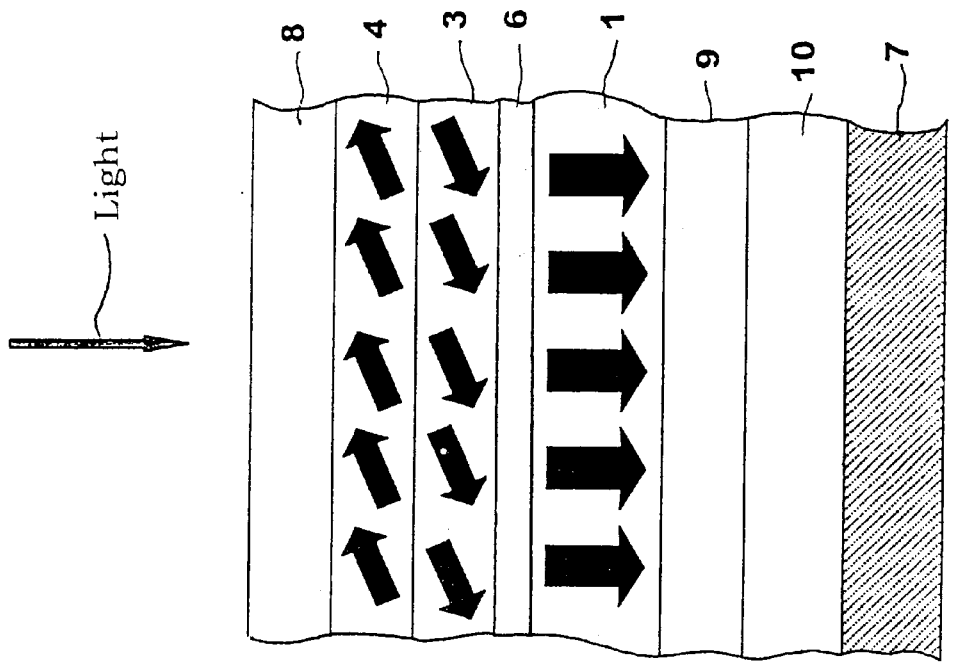
FIGS. 16(a) and (b) show an outline constitution of the magnetooptical recording medium in the present invention.
Figure 16A:
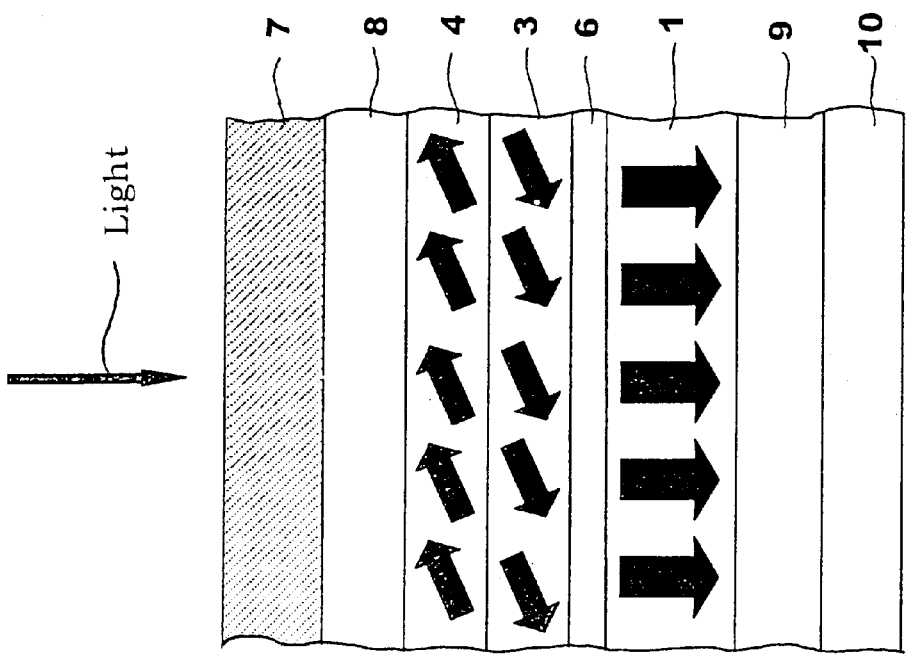

The magnetooptical recording medium of the present invention is provided with the substrate to be ordinarily used in the field of plastic substrate, glass substrate, silicone substrate, etc. The substrate may face the side of the reproduction layer or that of the recording layer. Also, it may be provided with the dielectric layer composed of SiN, $SiO_2$ and the like on the reproduction layer. Further, it may be provided with the dielectric layer composed of SiN, $SiO_2$ and the like on the recording layer opposite to the intermediate layer, and on the dielectric layer it may be provided with a radiating layer composed of such a material as Al, AlCr or AlTi. FIGS. 16(a) and (b) show more concrete constitutions. In the figures, 7 means the substrate, 8 and 9 mean the dielectric layer, and 10 means the radiating layer. Moreover, the medium of FIG. 16(a) is useful for back illumination, and the medium of FIG. 16(b) is preferably useful for front illumination.

The amplitude of the reproduction wave shape can be significantly improved by using the medium of the present invention, because the magnetizing direction of the reproduction layer takes the slant direction in comparison with the medium of CAD method wherein it takes the inplane direction. Further, since the reproduction wave shape can approach closely to sine wave in comparison with the medium of D-RAD method, various reproduction methods such as PRML technology utilizing sine wave can be applied in the present invention.

What is claimed is:

1. A magnetooptical recording medium comprising at least a magnetic reproduction layer, a magnetic intermediate layer, a connection layer and a recording layer, wherein the reproduction layer and intermediate layer have a slant magnetic direction in a non-magnetic field, and the connection layer is composed of a layer non-magnetic at room temperature by itself which is induced to exhibit magnetism by contact with a magnetic layer;

wherein the reproduction layer has a magnetization direction approximately 180° different from that of the intermediate layer.

2. The magnetooptical recording medium according to claim 1, wherein the reproduction layer has a Curie temperature higher than that of the intermediate layer.

3. The magnetooptical recording medium according to claim 1, wherein a combination of the reproduction layer, intermediate layer, connection layer and recording layer is any one of a first combination of rare earth element-rich layer/a transition metal-rich layer/a transition metal-rich layer/a transition metal-rich layer, a second combination of a transition metal-rich layer/a rare earth element-rich layer/a rare earth element-rich layer/a transition metal-rich layer, a third combination of a rare earth element-rich layer/a transition metal-rich layer/a transition metal-rich layer/a rare earth element-rich layer and a fourth combination of a transition metal-rich layer/a rare earth element-rich layer/a rare earth element-rich layer/a rare earth element-rich layer.

4. The magnetooptical recording medium according to claim 3, wherein in case of selection of either of the first and third combinations, the connection layer has a composition of $Gd_xNd_y$, where x is between about 9 to about 21 atom % and y is between about 91 to about 79 atom %.

5. The magnetooptical recording medium according to claim 4, wherein the connection layer has a thickness of between about 5 nm to about 14 nm.

6. The magnetooptical recording medium according to claim 3, wherein in case of selection of either of the second and fourth combinations, the connection layer has a composition of $Gd_xNd_y$, where x is between about 34 to about 80 atom % and y is between about 66 to about 20 atom %.

7. The magnetooptical recording medium according to claim 6, wherein the connection layer has a thickness between about 3 nm to about 8.5 nm.

8. The magnetooptical recording medium according to claim 3, wherein in case of selection of either of the first to third combinations, the connection layer is a layer of NdFeBi or AlFe.

9. The magnetooptical recording medium according to claim 1, wherein the recording layer is composed of two-layers of TbEeCo having different compositions.

10. The magnetooptical recording medium according to claim 1, wherein the recording layer is composed of a first recording layer of about 40 nm to about 45 nm thickness and a second recording layer of about 5 nm to about 10 nm thickness from a connection layer side of the recording layer.

11. The magnetooptical recording medium according to claim 1, wherein the reproduction layer has a multi-layered structure about 0.2 nm to about 0.5 nm lamination period.

12. A magnetooptical recording medium comprising at least a reproduction layer, an intermediate layer, a connection layer and a recording layer, wherein the reproduction layer and intermediate layer have a shift amount of between about 200 Oe to about 50 Oe in absolute value and the connection layer is composed of a layer non-magnetic at room temperature by itself which is induced to exhibit magnetism by contact with a magnetic layer.

13. A reproduction method for a magnetooptical recording medium as set forth in claim 1, comprising irradiating the magnetooptical recording medium with a reproducing light beam while applying an external magnetic field to form a high temperature part, a medium temperature part and a low temperature part within a spot of the beam and reproducing information from the medium temperature part with using the high temperature part and low temperature part as masks.

14. A reproduction method for a magnetooptical recording medium as set forth in claim 12, comprising irradiating the magnetooptical recording medium with a reproducing light beam while applying an external magnetic field to form a high temperature part, a medium temperature part and a low temperature part within a spot of the beam and reproducing information from the medium temperature part with using the high temperature part and low temperature part as masks.

* * * * *

UNITED STATES PATENT AND TRADEMARK OFFICE
CERTIFICATE OF CORRECTION

PATENT NO.   : 6,660,404 B2
DATED        : December 9, 2003
INVENTOR(S)  : Shoyo Ito It is certified that error appears in the above-identified patent and that said Letters Patent is hereby corrected as shown below:

<u>Column 10,</u>
Line 59, delete "TbEeCo" and insert -- TbFeCo --.

Signed and Sealed this

Fifteenth Day of June, 2004

JON W. DUDAS
*Acting Director of the United States Patent and Trademark Office*